United States Patent [19]

Yukimachi et al.

[11] 4,269,263
[45] May 26, 1981

[54] COOLING AND HEATING SYSTEM UTILIZING SOLAR HEAT

[75] Inventors: Katsurou Yukimachi, Sakai; Kouichi Katayama, Minoo, both of Japan

[73] Assignee: Osaka Gas Kabushiki Kaisha, Hiranomachi, Japan

[21] Appl. No.: 13,313

[22] Filed: Feb. 21, 1979

[30] Foreign Application Priority Data

Mar. 2, 1978 [JP] Japan .................. 53/024751
Sep. 12, 1978 [JP] Japan .................. 53/112751

[51] Int. Cl.³ .................. F25B 29/00; F25B 27/00
[52] U.S. Cl. .................. 165/29; 165/48 S; 165/62; 62/2; 62/238.3; 62/324.2; 237/2 B
[58] Field of Search .................. 165/29, 48, 48 S, 62; 62/2, 238 B, 324 B, 332; 237/2 B

[56] References Cited

U.S. PATENT DOCUMENTS 4,070,870  1/1978  Bahel et al. .................. 62/2
4,100,755  7/1978  Leonard .................. 62/2
4,178,989  12/1979  Takeshita et al. .................. 165/62

Primary Examiner—Albert W. Davis
Assistant Examiner—Margaret A. Focarino
Attorney, Agent, or Firm—Haseltine and Lake

[57] ABSTRACT

A cooling and heating system utilizing solar heat comprises a heat collector for heating a circulating heat medium with solar heat, an absorption refrigerator operable with the heat medium heated by the heat collector and serving as a generating heat source to provide a chilled medium, and an air-conditioning unit for circulating the chilled medium or the heated medium alternatively therethrough to cool or heat the space to be air-conditioned. The system further comprises a bypass line provided with an auxiliary refrigerator of the dual-effect type and connected to an intermediate portion of a line extending from the absorption refrigerator to the air-conditioning unit for supplying chilled medium or the heated medium to the unit. Change-over means is provided for passing the chilled medium or the heated medium through the bypass line.

6 Claims, 2 Drawing Figures

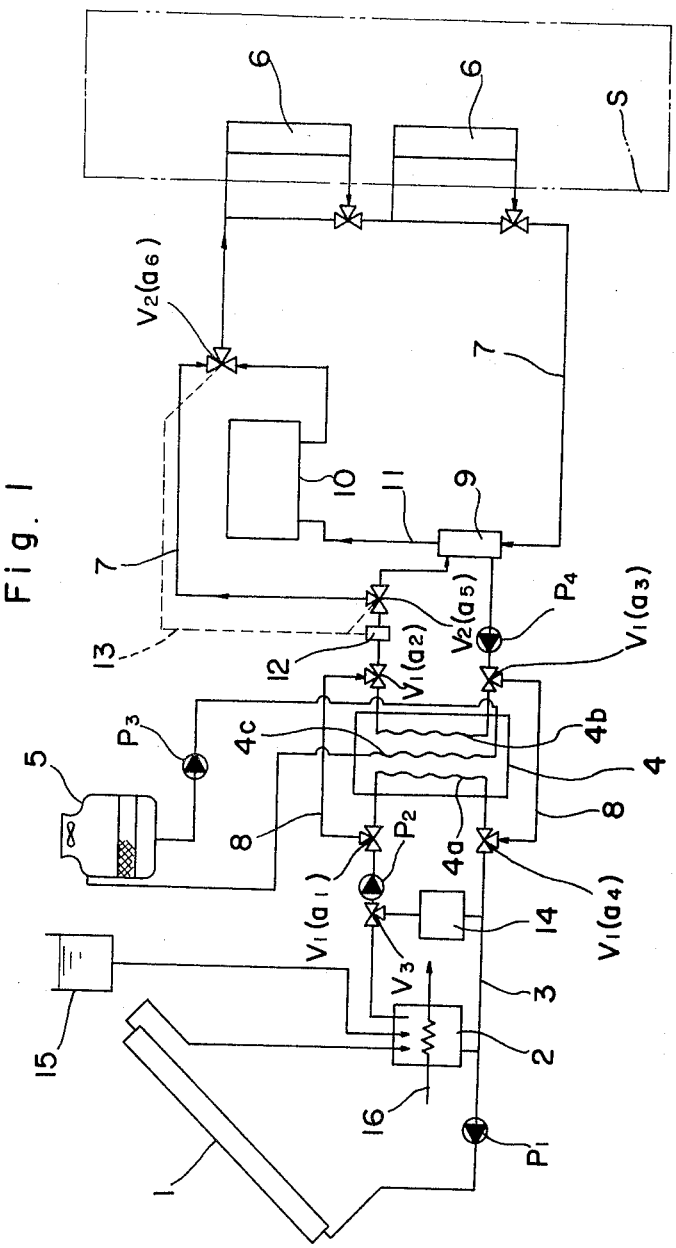
Fig. I

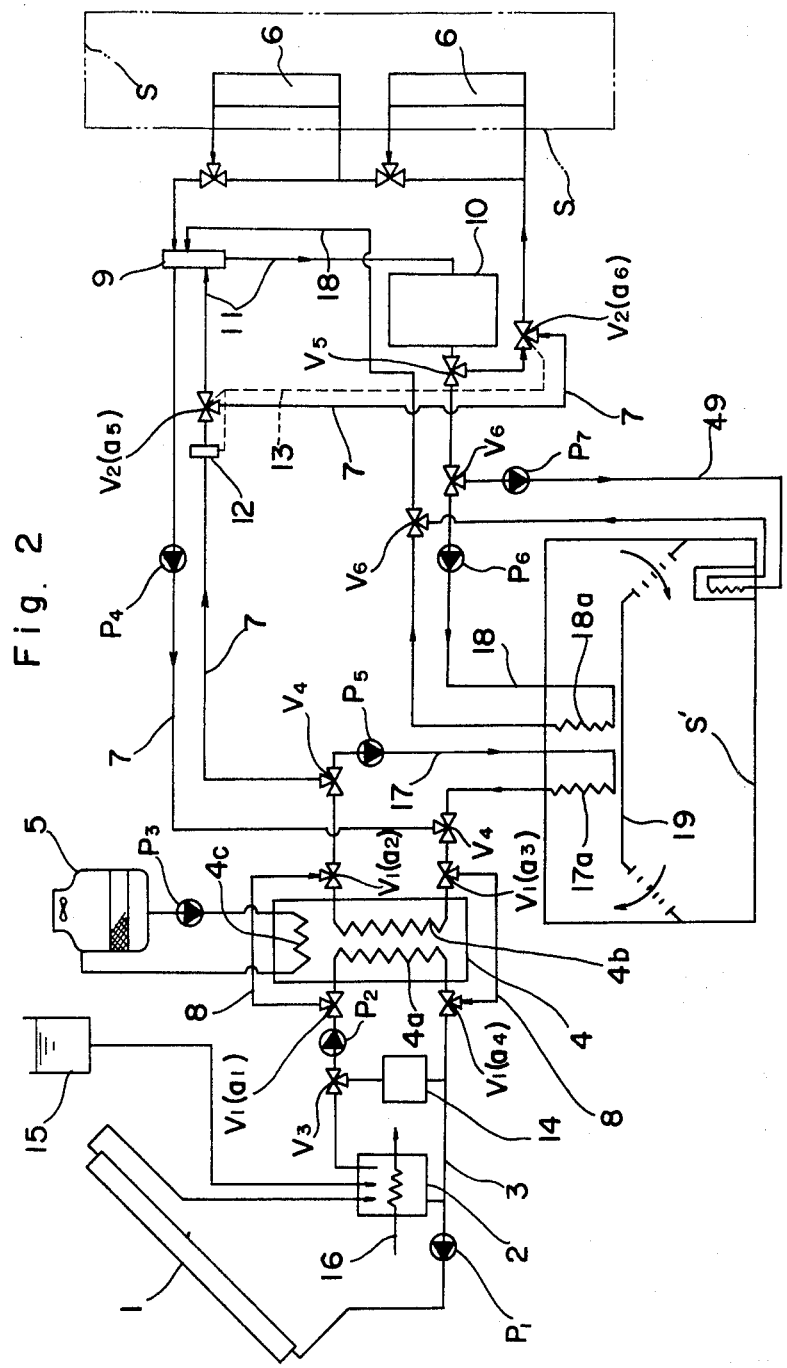

COOLING AND HEATING SYSTEM UTILIZING SOLAR HEAT

BACKGROUND OF THE INVENTION

The present invention relates to a cooling and heating system utilizing solar heat and comprising a heat collector for heating a circulating heat medium with solar heat, an absorption refrigerator operable with the heat medium heated by the heat collector and serving as a regenerating heat source to provide a chilled medium, and an air-conditioning unit for circulating the chilled medium or the heated medium alternatively therethrough to cool or heat the space to be air-conditioned.

Conventional cooling and heating systems of this type mainly resort to the use of the solar heat collected by a heat collector and serving as a cooling and heating energy source and therefore have the following problems:

(1) Although the air-conditioning load varies greatly throughout the year, the heat collector as well as the refrigerator must have a considerably large capacity adapted for the maximum load during the year.

(2) When the air-conditioning load is small, accordingly, the heat collector and the refrigerator are unable to exhibit their abilities to the greatest possible extent, invariably failing to permit the system to achieve a high thermal efficiency all the year round.

(3) Consequently there arises the necessity of using a heat accumulator of fairly large capacity for storing the excess of heat when the air-conditioning load is small despite sufficient sunshine.

(4) There is the inherent requirement that the heat medium for operating the refrigerator must have a temperature of at least about 82° C. Additionally an absorption refrigerator, if used for the system, must be fully operable with solar heat to provide a chilled medium at an optimum temperature of about 7 to about 8° C. as requied for air conditioning. The heat medium needs then to have a considerably high temperature of at least about 88° C. Thus when the heat collector is unable to give the desired amount of heat medium owing to insufficient sunshine, there arises a need to use an auxiliary heat source in addition to solar heat. Further when no sunshine is available, the refrigerator must be operated solely with the auxiliary heat source. The refrigerator nevertheless is inherently as low as about 0.65 to about 0.68 in coefficient of performance (C.O.P.) and therefore necessitates a fairly large auxiliary heat source, which renders the refrigerator very inefficient to operate.

Accordingly the conventional systems are not fully satisfactory in overall thermal efficiency, require a high running cost and involve the problem that the relatively great investment in equipment is not completely repayable.

SUMMARY OF THE INVENTION

A first object of this invention is to overcome the foregoing problems and to provide a cooling and heating system utilizing solar heat, comprising components such as a heat collector, refrigerator, auxiliary heat source and heat accumulator which are made compact to the greatest possible extent, and adapted to achieve an improved overall thermal efficiency, the system thereby being rendered satisfactorily operable with high stability at all times and at low initial and running costs.

To fulfill this object, the refrigerator is of the absorption type operable with a heat medium heated by the heat collector to provide a chilled medium. The cooling and heating system of the invention is characterized in that a bypass line provided with an auxiliary refrigerator of the dual-effect type is connected to an intermediate portion of a line extending from the absorption refrigerator to an air-conditioning unit for supplying the chilled medium or heated medium to the unit, changeover means being provided for passing the chilled medium or the heated medium through the bypass line.

Usable as the dual-effect auxiliary refrigerator is a gas-burning absorption refrigerator relatively simple in construction and having a high C.O.P. (0.95 for cooling or 0.8–0.9 for heating).

The system described operates with solar heat alone without operating the auxiliary refrigerator when sufficient sunshine is available for the air-conditioning load. Further when the sunshine is insufficient relative to the air-conditioning load, the system operates utilizing the solar heat to the greatest possible extent with the deficiency compensated for by the auxiliary refrigerator having a high thermal efficiency. The efficient auxiliary refrigerator affords the desired operation when no sunshine is available. Thus the system provides suitable cooling or heating with stability and high efficiency at all time, achieving greatly improved thermal efficiency and performance in its entirety when evaluated on a year-round basis. Since the auxiliary refrigerator operates at any time to compensate for the deficiency of the solar heat available for the air-conditioning load, the heat collector, main refrigerator and auxiliary heat source need not always be large enough to accommodate the maximum air-conditioning load throughout the year but can be compacted to the greatest possible extent. This further permits the use of a heat accumulator of reduced capacity. The system therefore assures savings in running cost, renders the equipment investment repayable within a relatively short period and is extremely economical.

A second object of this invention is to provide a cooling and heating system utilizing solar heat and adapted for use with a plurality of spaces to be air-conditioned between which there is a considerable difference in load as in the case of two buildings positioned relatively close to each other or of a large building which is exposed to sufficient sunshine at one portion while only insufficient sunshine is available at another portion, the system being such that these spaces, involving varying loads, can be cooled or heated individually suitably with economy and with a very high overall efficiency even when the system is used singly.

To fulfill this object, the cooling and heating system of the invention having the foregoing construction further comprises a first branch line extending from the supplying line and adapted to be placed into or out of use by change-over, a second branch line extending from the bypass line and adapted to be placed into or out of use by change-over, and a further air-conditioning unit having the two branch lines arranged in parallel therein for another space to be air-conditioned.

According to the arrangement described above, the two branch lines can be suitably selectively brought into or out of use respectively in accordance with the differing air-conditioning loads of the spaces to be air-conditioned, so that these spaces, although different in air-conditioning loads, can be cooled or heated individually suitably by the single system with economy and very high efficiency.

Other objects and benefits of the invention will become apparent from the following description.

BRIEF DESCRIPTION OF THE DRAWINGS

FIG. 1 is a diagram showing a first embodiment of the cooling and heating system of this invention utilizing solar heat; and FIG. 2 is a diagram showing a second embodiment thereof.

DESCRIPTION OF THE PREFERRED EMBODIMENTS

A first embodiment of the invention will be described with reference to FIG. 1.

A solar heat collector 1 connected to a heat accumulator 2 via a pump P1 includes a group of parallel collector panels arranged therein for collecting solar heat. The collected heat is given to water or like heat medium circulated by the pump P1 to heat the medium. The heated medium is stored in the heat accumulator 2 at a high temperature. The heat accumulator 2 is connected to the generator 4a of an absorption refrigerator 4, about 0.6 to about 0.7 in C.O.P. (coefficient of performance), by a heated medium circulating line 3 provided with a pump P1 at an intermediate portion thereof. The refrigerator 4 has a condenser 4c connected via a pump P3 to a cooling tower 5 and an evaporator 4b connected to fan coil units or like air-conditioning units 6 disposed in the space S to be air-conditioned, by a supply line 7 provided with a pump P4 at an intermediate portion thereof for circulating an air-conditioning fluid. Heated medium bypass lines 8 bypassing the refrigerator 4 interconnect the forward passages of the lines 3 and 7 and also the return passages thereof. Change-over valves V1 are provided at the four junctions $a_1$, $a_2$, $a_3$ and $a_4$ between the bypass lines 8 and the two lines 3 and 7.

Thus when the change-over valves V1 are operated to bring the bypass lines 8 into conduction, the hot water or like heated medium from the heat accumulator 2 is bypassed around the refrigerator 4 and flows directly through the line 7 for heating. Alternatively when the change-over valves V1 are operated otherwise to bring the line 3 into communication with the generator 4a, and the evaporator 4b with the line 7, the refrigerator 4 operates with the heated medium supplied from the heat accumulator 2 and serving as its generating heat source, providing chilled water or like medium which circulates through the line 7 for cooling. In this way, the system is made operable alternatively for heating or cooling by the change-over of the valves V1. Change-over valves V2 each in the form of a three-way valve are disposed at two portions $a_5$ and $a_6$ of the forward passage of the supply line 7 between the refrigerator 4 and the air conditioning units 6. A line 11 bypassing the line 7 extends from one valve V2 to the other valve V2. The change-over valve V2 at the portion $a_6$ is rendered serviceable also as a mixing valve. The bypass line 11 is provided with a dual-effect auxiliary refrigerator 10 which operates for cooling or heating alternatively on change-over. The auxiliary refrigerator 10 is of the gas-burning absorption type and has a C.O.P. of about 0.95 for cooling or of about 0.8 to about 0.9 for heating. A header 9 is provided between the bypass line 11 and the return passage of the supply line 7.

The forward passage of the supply line 7 is provided, between the portions $a_2$ and $a_5$, with a temperature sensor 12 for detecting the temperature of the chilled or heated medium therebetween. Change-over means 13 provided for the two change-over valves V2 is electrically connected to the temperature sensor 12 to automatically operate the valves V2 in accordance with the temperature detected by the sensor 12 so that the chilled medium or heated medium, after passing through the change-over valve V1 at the portion $a_2$, will be circulated through the line 7 or alternatively bypassed through the line 11. The temperature settings for effecting the change-over based on the detected temperature are variable as desired in accordance with cooling or heating and the air-conditioning load, etc. With the present embodiment, the change-over temperature for cooling is set at about 9 to about 10° C., and that for heating at about 49 to about 50°C.

Stated more specifically, the change-over valves V2 during cooling are automatically changed-over to pass the chilled medium from the refrigerator 4 through the line 7 if the temperature thereof detected by the sensor 12 is lower than 8 to 9° C. or to bypass the same through the line 11 if the detected temperature is higher than 9 to 10° C. During heating, the change-over valves V2 are automatically changed-over to pass the heated medium from the heat accumulator 2 through the line 7 if the temperature thereof detected by the sensor 12 is higher than 50 to 51° C. or to bypass the same through the line 11 if the detected temperature is lower than 49 to 50° C. The change-over valve V2 at the portion $a_6$ is openable at two inlets at the same time so as to be serviceable as a mixing valve as already stated. Accordingly even when the valves V2 are open for the line 7, the auxiliary refrigerator 10 can be operated at the same time to cause the medium through the line 11 to be thereby heated or chilled and mixed at the portion $a_6$ with the heated or chilled medium through the line 7.

Indicated at 14 is an auxiliary boiler serving as an auxiliary heat source and connected in parallel with the heated medium circulating line 3 via a three-way valve V3, at 15 a pressure adjusting tank useful when the circulating line 3 is held closed, and at 16 a hot water supply circuit.

The cooling and heating system utilizing solar heat and having the construction described above will operate in the following manner, for example, for cooling during summer.

(i) When sufficient sunshine is available, permitting the heat accumulator 2 to maintain the heat medium at about 85° C. and the refrigerator 4 to supply the chilled medium at about 8 to about 9° C., and the load on the air-conditioning units 6 is not greater than can be accommodated by the refrigerator 4, the change-over valves V2 automatically maintain the supply line 7 in a conductive state. Consequently the chilled medium from the refrigerator 4 alone is passed through the air-conditioning units 6 to cool the space S only with the solar heat. When the load on the air-conditioning units 6 has exceeded the capacity of the refrigerator 4, the auxiliary refrigerator 10 functions, causing the resulting chilled medium to be mixed, by the change-over valve V2 at the portion $a_6$, with the medium from the refrigerator 4.

(ii) When a lesser amount of sunshine is available, resulting in a reduction in the temperature of the heat medium in the accumulator 2 and an increase in the temperature of the chilled medium from the refrigerator 4 to about 10 to about 11° C., the sensor 12 detects this, automatically operating the change-over valves V2 to bring the bypass line 11 alone into conduction. The chilled medium supplied at about 10 to about 11° C. from the refrigerator 4 is mixed at the header 9 with part of the cooling medium returning at about 13 to 14° C. from the air-conditioning units 6, thus precooling the returning medium by an amount corresponding to the mixing ratio (i.e. to about 12 to about 13° C.). The mixture is then chilled to 7 to 8° C. by the auxiliary refrigerator having a high C.O.P. and thereafter fed to the air-conditioning units 6. (When the flow through the refrigerator 4 is small, the returning cooling medium from the air-conditioning units 6 may be wholly returned to the auxiliary refrigerator 10 via the header 9 even if the chilled medium has a temperature of 8 to 9° C.)

(iii) When no sunshine is available with the air-conditioning load at a relatively low level, the auxiliary refrigerator 10 alone is operated for air conditioning.

(iv) When there is no sunshine available with the air-conditioning load exceeding the capacity of the auxiliary refrigerator 10, the three-way valve V3 is changed-over, and the auxiliary boiler 14 serving as an auxiliary heat source is operated to bring the circuit into the state of (i) or (ii) above and effect air conditioning by both the refrigerators 4 and 10.

The operation of the system during winter for heating will be apparent from the above description of the summer-time cooling operation.

When there is not a great necessity for heating, the auxiliary refrigerator 10 may be one adapted solely for refrigeration.

FIG. 2 shows another embodiment of the cooling and heating system utilizing solar heat according to this invention and adapted for use with a plurality of spaces to be air-conditioned between which there is a difference in air-conditioning load, such that even when used singly, the embodiment is capable of cooling and heating the spaces individually suitably with high efficiency.

This embodiment will be described below, but the same parts as included in the first embodiment will not be described. Change-over valves V4, each in the form of a three-way valve and openable at two outlets or inlets at the same time, are disposed at a location between the portion a2 and the temperature sensor 12 and another location between the pump P4 and the portion a3. By way of the change-over valves V4, a first branch line 17 extends from the supply line 7. The branch line 17 is provided with a pump P5 and a heat exchanger 17a.

Provided between the auxiliary rerigerator 10 and the portion a6 is a change-over valve V5 comprising a three-way valve openable at two outlets at the same time. By way of the header 9 and the change-over valve V5, a second branch line 18 extends from the bypass line 11. The branch line 18 has a pump P6 and a heat exchanger 18a.

An air-conditioning unit 19 of the duct type having the heat exchangers 17a and 18a arranged in parallel therein is provided for the space S', different from the space S, to be air-conditioned. Three-way valves V6 openable at two outlets and two inlets respectively are mounted on intermediate portions of the second branch line 18. Via the two valves V6, a third branch line 49 extends from the second branch line 18. The third branch line 49 serves to efficiently air-condition the space S'.

The system of the above construction can be changed over from one state to another for operation in various modes in accordance with the amount of solar heat collected, the load involved in each of the spaces S and S', etc. For instance, when sufficient solar heat is available with a great load involved in the space S and a small load in the space S', the two lines 7 and 11 are used for the air-conditioning units 6 to air-condition the space S with the collected solar heat and by the auxiliary refrigerator 10, while the line 17 alone is used for the air-conditioning unit 19 to air-condition the space S' with the solar heat only. In this case, the change-over valves V4 are opened at the two outlets and inlets at the same time respectively, whereas the change-over valve V5 is opened for the line 11 and closed for the line 18. The change-over valves V2 are automatically operated by the change-over means 13 in accordance with the temperature detected by the sensor 12.

The change-over valves will be operated suitably for the other modes of operation in accordance with the amount of solar heat available, the loads involved in the spaces S and S', the sizes thereof and other conditions concerned.

We claim:
1. In a cooling and heating system utilizing solar heat comprising:
 a solar heat collector (1),
 a heat accumulator (2) for storing fluid heated by solar heat obtained by said solar heat collector (1),
 a single-effect absorption type refrigerator (4) connected to said heat accumulator (2) via heated fluid circulating lines (3), and actuated by said heated fluid supplied from said heat accumulator (2) to produce chilled fluid,
 at least one air-conditioning unit (6) connected to said single-effect absorption type refrigerator (4) via air-conditioning fluid circulating lines (7), and adapted to cool or heat space (S) to be air-conditioned,
 heated fluid bypass lines (8) provided between said heated fluid circulating lines (3) and said air-conditioning fluid circulating lines (7) to bypass said single-effect absorption type refrigerator (4), and
 change-over valves (V1) provided at junctions (a1), (a2), (a3), (a4) of said heated fluid bypass lines (8) to said heated fluid circulating lines (7), and adapted to selectively changeover between a heating state to supply said heated fluid from said heat accumulator (2) directly to said air-conditioning unit (6) and a cooling state to supply said heated fluid from said heat accumulator (2) to said single-effect absorption type refrigerator (4) and supply the chilled fluid generated by the single-effect absorption type refrigerator (4) to said air-conditioning unit (6),
 the improvement comprising:
 a further bypass line (11) connected in parallel to an intermediate portion of a forward passage of said air-conditioning fluid circulating lines (7),
 change-over valves (V2) provided at junctions (a5), (a6) of said further bypass line (11) to said forward passage of said air-conditioning fluid circulating lines (7) and adapted to selectively changeover between a state to bypass and a state not to bypass said heated or chilled fluid from said forward passage of said air-conditioning fluid (7) to said further bypass line (11), and an auxiliary gas-burning double-effect absorption type refrigerator (10) provided on an intermediate portion of said further bypass line (11) to further heat or chill the heated or chilled fluid supplied from said forward passage of said air-conditioning circulating lines (7).

2. A cooling and heating system as claimed in claim 1, wherein a header (9) is provided between the bypass line (11) and a return passage portion of the supplying line (7).

3. A cooling and heating system as claimed in claim 1, wherein the change-over means (13) is automatically operable for change-over in accordance with the temperature detected by a temperature sensor (12) disposed upstream from the change-over means (13).

4. A cooling and heating system as claimed in claim 3, wherein the air-conditioning unit (6) is a fan coil unit.

5. A cooling and heating system as claimed in claim 2, further comprising a first branch line (17) extending from the supplying line (7) and adapted to be placed into or out of use by change-over, a second branch line (18) extending from the bypass line (11) and adapted to be placed into or out of use by change-over, and a further air-conditioning unit (19) having the two branch lines arranged in parallel therein for another space (S') to be air-conditioned.

6. A cooling and heating system as claimed in claim 5, wherein the further air-conditioning unit (19) is of the duct type.

* * * * *